United States Patent
Tanaka

(10) Patent No.: US 12,442,664 B2
(45) Date of Patent: Oct. 14, 2025

(54) ROTATION DETECTOR AND ROTATION DETECTION METHOD

(71) Applicant: Panasonic Intellectual Property Management Co., Ltd., Osaka (JP)

(72) Inventor: Masaki Tanaka, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 165 days.

(21) Appl. No.: 18/561,315

(22) PCT Filed: Apr. 19, 2022

(86) PCT No.: PCT/JP2022/018112
§ 371 (c)(1),
(2) Date: Nov. 16, 2023

(87) PCT Pub. No.: WO2022/249795
PCT Pub. Date: Dec. 1, 2022

(65) Prior Publication Data
US 2024/0344852 A1    Oct. 17, 2024

(30) Foreign Application Priority Data
May 27, 2021  (JP) .................. 2021-088894

(51) Int. Cl.
*G01D 5/14* (2006.01)

(52) U.S. Cl.
CPC ......... *G01D 5/145* (2013.01); *G01D 2205/24* (2021.05)

(58) Field of Classification Search
CPC ................... G01D 5/145; G01D 2205/24
See application file for complete search history.

(56) References Cited

U.S. PATENT DOCUMENTS

| | | | |
|---|---|---|---|
| 9,631,948 B2 * | 4/2017 | Mehnert | G01D 5/145 |
| 2015/0338245 A1 * | 11/2015 | Tatei | G01D 5/244 |
| | | | 324/207.17 |

FOREIGN PATENT DOCUMENTS

| | | |
|---|---|---|
| JP | 6336232 B | 6/2018 |
| WO | 2021/215076 | 10/2021 |

OTHER PUBLICATIONS

International Search Report of PCT application No. PCT/JP2022/018112 dated May 31, 2022.

* cited by examiner

*Primary Examiner* — Stephanie E Bloss
*Assistant Examiner* — Michael A Harrison
(74) *Attorney, Agent, or Firm* — Rimon P.C.

(57) ABSTRACT

Provided is a rotation detector capable of suppressing the occurrence of erroneous detection. Rotation detector includes magnet that rotates together with a rotary shaft, a plurality of power generation elements that generate power according to a change in a magnetic field due to rotation of magnet together with the rotary shaft, and a plurality of magnetic sensors provided to a corresponding one of the plurality of power generation elements. Rotation detector further includes information processor that determines a rotational position of the rotary shaft by using the plurality of magnetic sensors, and generated power supply unit that supplies the power generated by each of the plurality of power generation elements only to the corresponding one of the plurality of power generation elements.

11 Claims, 8 Drawing Sheets

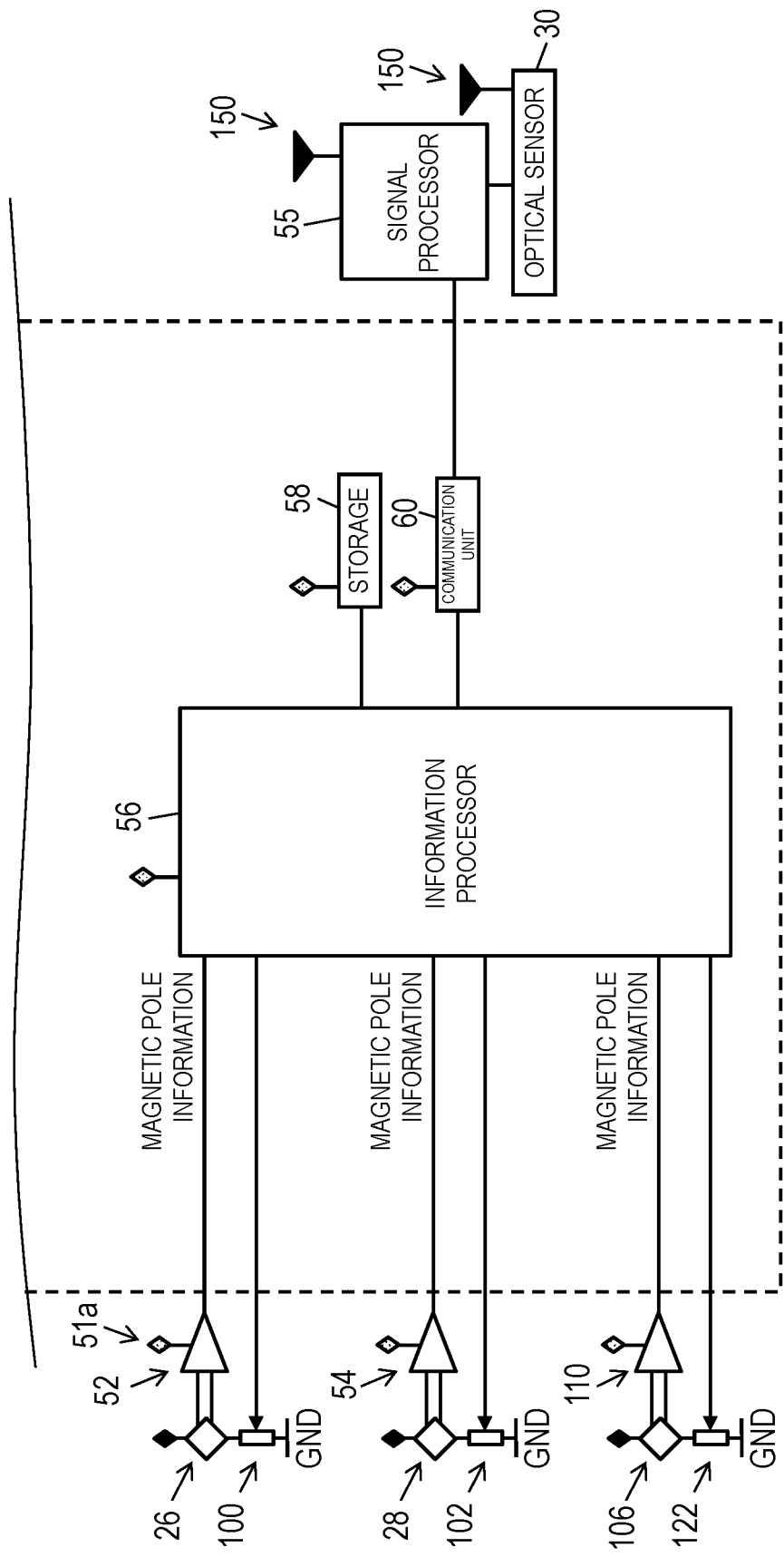

ROTATION DETECTOR AND ROTATION DETECTION METHOD

CROSS-REFERENCE TO RELATED APPLICATIONS

This application is a U.S. national stage application of the PCT International Application No. PCT/JP2022/018112 filed on Apr. 19, 2022, which claims the benefit of foreign priority of Japanese patent application No. 2021-088894 filed on May 27, 2021, the contents all of which are incorporated herein by reference.

TECHNICAL FIELD

The present disclosure relates to a rotation detector and a rotation detection method, and more particularly to a rotation detector and a rotation detection method for detecting rotation of a rotary shaft of a rotating body.

BACKGROUND ART

Conventionally, there is a rotation detector that detects rotation of a rotary shaft of a motor. For example, Patent Literature 1 discloses a rotation detector including a disk-shaped magnet provided on a shaft, and three power generators configured by a magnetic wire and a pickup coil, in which each of the three power generators is disposed on one of a plurality of sides of a virtual triangle formed on an end surface side of the magnet.

CITATION LIST

Patent Literature

PTL 1: Japanese Patent No. 6336232

SUMMARY OF THE INVENTION

However, in the rotation detector in Patent Literature 1, there is a problem that the power generated by the power generator cannot be appropriately supplied, and erroneous detection occurs.

The present disclosure has been made to solve such a problem, and an object thereof is to provide a rotation detector and a rotation detection method capable of suppressing the occurrence of erroneous detection.

A rotation detector according to one aspect of the present disclosure includes a magnet that rotates together with a rotary shaft; a plurality of power generation elements that generate power according to a change in a magnetic field due to rotation of the magnet together with the rotary shaft; and a plurality of magnetic sensors each provided to a corresponding one of the plurality of power generation elements. The rotation detector further includes an information processor that determines a rotational position of the rotary shaft by using the plurality of magnetic sensors; and a generated power supply unit that supplies power generated by each of the plurality of power generation elements only to the corresponding one of the plurality of power generation elements.

A rotation detection method according to one aspect of the present disclosure is a rotation detection method using a rotation detector. The rotation detector includes a magnet that rotates together with a rotary shaft, a plurality of power generation elements that generate power according to a change in a magnetic field due to rotation of the magnet together with the rotary shaft, a plurality of magnetic sensors each provided to a corresponding one of the plurality of power generation elements, and a generated power supply unit that supplies power generated by each of the plurality of power generation elements only to the corresponding one of the plurality of power generation elements. The rotation detection method includes determining in which region among a plurality of regions arranged in a rotation direction of the rotary shaft a reference position in the rotation direction of the rotary shaft is located, based on power generation information indicating a power generation element that has generated power among the plurality of power generation elements and detection information indicating a detection result from a magnetic sensor corresponding to the power generation element among the plurality of magnetic sensors; and storing a region in which the reference position is determined to be located among the plurality of regions.

According to the present disclosure, it is possible to provide a rotation detector and a rotation detection method capable of suppressing the occurrence of erroneous detection.

BRIEF DESCRIPTION OF THE DRAWINGS

FIG. 8 is a block diagram illustrating another part of the functional configuration of the rotation detector in FIG. 6.

DESCRIPTION OF EMBODIMENT

Figure 1:
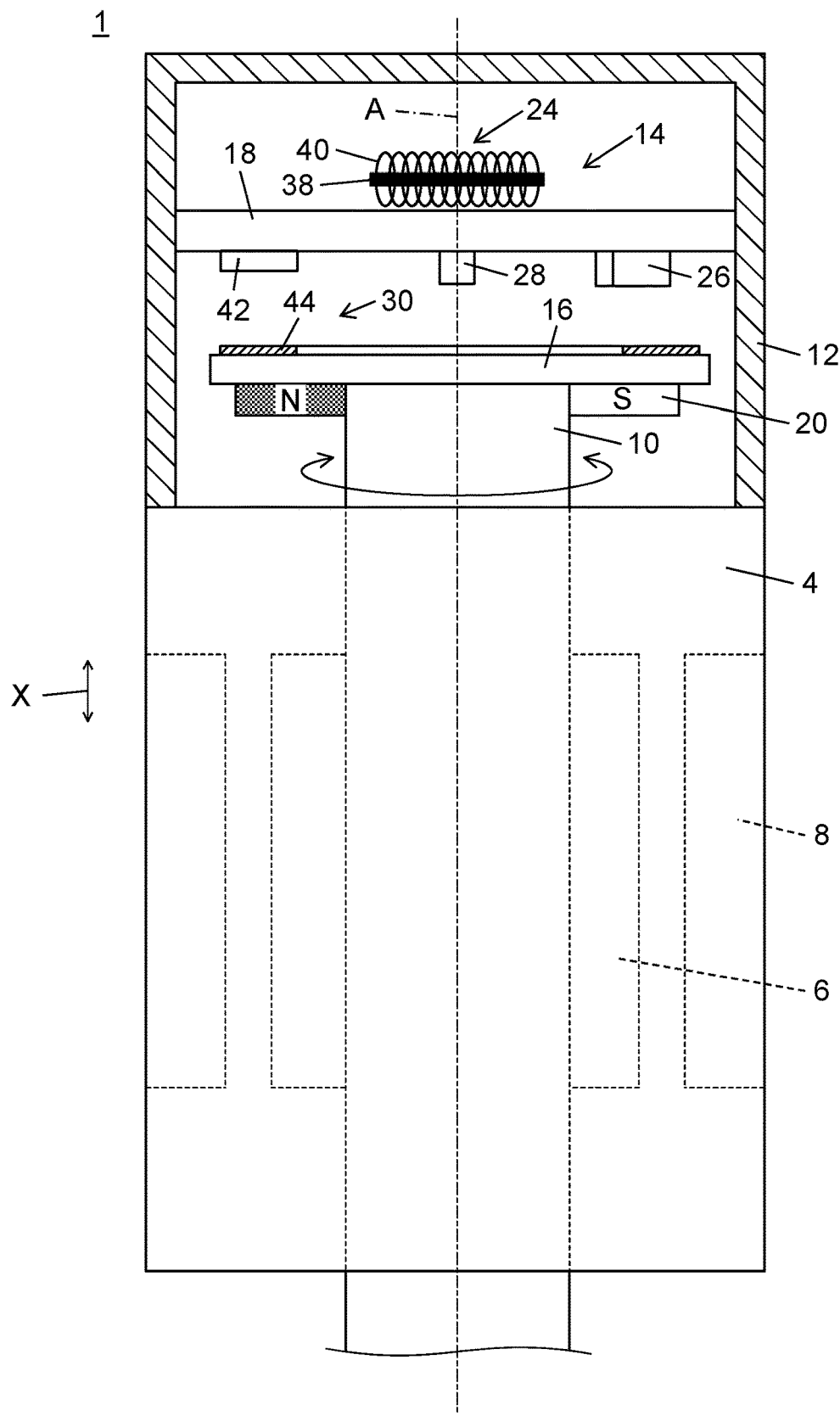
FIG. 1 is a diagram illustrating a motor including a rotation detector according to a first exemplary embodiment.

Hereinafter, exemplary embodiments of the present disclosure will be described. Note that all the exemplary embodiments described below show one specific example of the present disclosure. Therefore, numerical values, constituent elements, disposition positions and connection modes of the constituent elements, and steps, order of the steps, and the like illustrated in the following exemplary embodiments are merely examples, and are not intended to limit the present disclosure. Thus, among the constituent elements in the following exemplary embodiments, constituent elements that are not described in independent claims indicating the highest concept of the present disclosure are described as optional constituent elements.

Each of the drawings is a schematic view, and is not necessarily precisely illustrated. Note that, in all the drawings, substantially the same configurations are denoted by the same reference numerals, and redundant description will be omitted or simplified.

First Exemplary Embodiment

FIG. 1 is a diagram illustrating motor 1 including rotation detector 14 according to a first exemplary embodiment. FIG.

Figure 2:
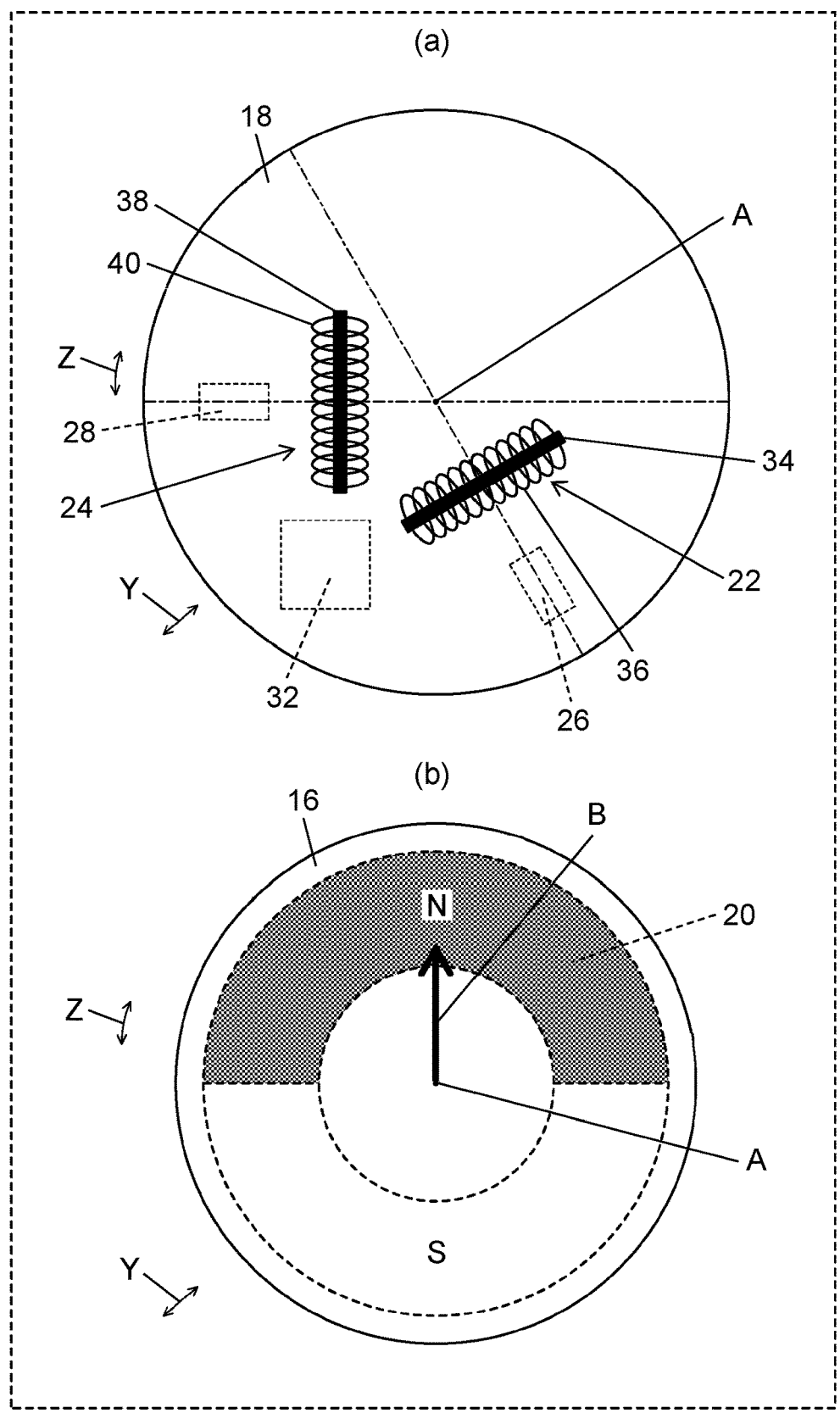
FIG. 2 is a diagram illustrating a substrate and a rotary plate of the rotation detector in FIG. 1.

2 is a diagram illustrating substrate 18 and rotary plate 16 of rotation detector 14 in FIG. 1. Part (a) of FIG. 2 illustrates substrate 18, and part (b) of FIG. 2 illustrates rotary plate 16. In FIG. 1, case 12, magnet 20, and reflection pattern 44 are illustrated in a cross section. In FIG. 1, power generation element 22 and control circuit 32 illustrated in FIG. 2 are not illustrated. In FIG. 2, optical sensor 30 illustrated in FIG. 1 is not illustrated.

As illustrated in FIG. 1, motor 1 includes main body 4, rotor 6, stator 8, rotary shaft 10, case 12, and rotation detector 14. A rotation axis line direction is a direction in which rotation axis line A of rotary shaft 10 extends (refer to an arrow X in FIG. 1).

Rotor 6 and stator 8 are accommodated in main body 4. Rotor 6 rotates about stator 8.

Rotary shaft 10 extends in the rotation axis line direction and has a rod shape such as a columnar shape. The axis of rotary shaft 10 and rotation axis line A coincide with each other. Rotary shaft 10 is fixed to rotor 6 and rotates about rotation axis line A. For example, when power is supplied to motor 1, rotary shaft 10 rotates about rotation axis line A together with rotor 6 based on the power. A rotation direction of rotary shaft 10 (refer to an arrow Z in FIG. 2) coincides with a circumferential direction around rotation axis line A. Rotation detector 14 is provided at one end of rotary shaft 10 in the rotation axis line direction. A load (not illustrated) that is rotationally driven due to the rotation of rotary shaft 10 is attached to the other end of rotary shaft 10 in the rotation axis line direction. For example, rotary shaft 10 is made of a magnetic metal such as iron.

Case 12 is attached to main body 4 to cover one end of rotary shaft 10 in the rotation axis line direction and rotation detector 14. For example, case 12 is made of a magnetic metal such as iron.

Rotation detector 14 detects the rotation of rotary shaft 10. For example, rotation detector 14 detects a rotational position of rotary shaft 10, a rotation direction of rotary shaft 10, a rotation speed of rotary shaft 10, and the like. For example, rotation detector 14 is an absolute encoder. As described above, rotation detector 14 is provided at one end of rotary shaft 10 in the rotation axis line direction. As illustrated in FIGS. 1 and 2, rotation detector 14 includes rotary plate 16, substrate 18, magnet 20, a plurality of power generation elements 22, 24, a plurality of magnetic sensors 26, 28, optical sensor 30, and control circuit 32.

Rotary plate 16 extends in a direction orthogonal to the rotation axis line direction. Specifically, rotary plate 16 has a disk shape having a main surface extending in a direction orthogonal to the rotation axis line direction, and is circular when viewed from the rotation axis line direction. Rotary plate 16 is attached to one end of rotary shaft 10 in the rotation axis line direction. The axis of rotary plate 16 coincides with rotation axis line A. Rotary plate 16 rotates together with rotary shaft 10.

Substrate 18 extends in a direction orthogonal to the rotation axis line direction. Specifically, substrate 18 has a disk shape having a main surface extending in a direction orthogonal to the rotation axis line direction, and is circular when viewed from the rotation axis line direction. Substrate 18 is disposed at an interval from one end of rotary shaft 10 and rotary plate 16 in the rotation axis line direction, and faces rotary plate 16. The axis of substrate 18 coincides with rotation axis line A. Substrate 18 is fixed to an inner surface of case 12, and does not rotate together with rotary shaft 10.

Magnet 20 rotates together with rotary shaft 10. Specifically, when rotary shaft 10 rotates, magnet 20 rotates together with rotary shaft 10 and rotary plate 16. Magnet 20 has an annular shape and is disposed in the rotation direction of rotary shaft 10. Magnet 20 has a plate shape of which a thickness direction is the rotation axis line direction. Magnet 20 is disposed on the main surface of rotary plate 16 on the side opposite to substrate 18. Magnet 20 has an N pole and an S pole disposed side by side with the N pole in the rotation direction of rotary shaft 10. One half of magnet 20 is magnetized to the N pole, and the other half of magnet 20 is magnetized to the S pole.

Each of the plurality of power generation elements 22, 24 generates power according to a change in the magnetic field due to the rotation of magnet 20 together with rotary shaft 10.

The plurality of power generation elements 22, 24 are disposed with a phase difference in the rotation direction of rotary shaft 10. Specifically, in the rotation direction of rotary shaft 10, the plurality of power generation elements 22, 24 are disposed with an angular interval larger than or equal to an angular interval between a first position where one power generation element of the plurality of power generation elements 22, 24 generates power when rotary shaft 10 rotates clockwise and a second position closest to the first position among one or more positions where the one power generation element generates power when rotary shaft 10 rotates counterclockwise in the rotation direction of rotary shaft 10. Note that the clockwise direction is a clockwise direction when viewed from the side of substrate 18 opposite to rotary plate 16 in the rotation axis line direction, and the counterclockwise direction is a counterclockwise direction when viewed from the side of substrate 18 opposite to rotary plate 16 in the rotation axis line direction. The same applies to the following description.

Figure 4:
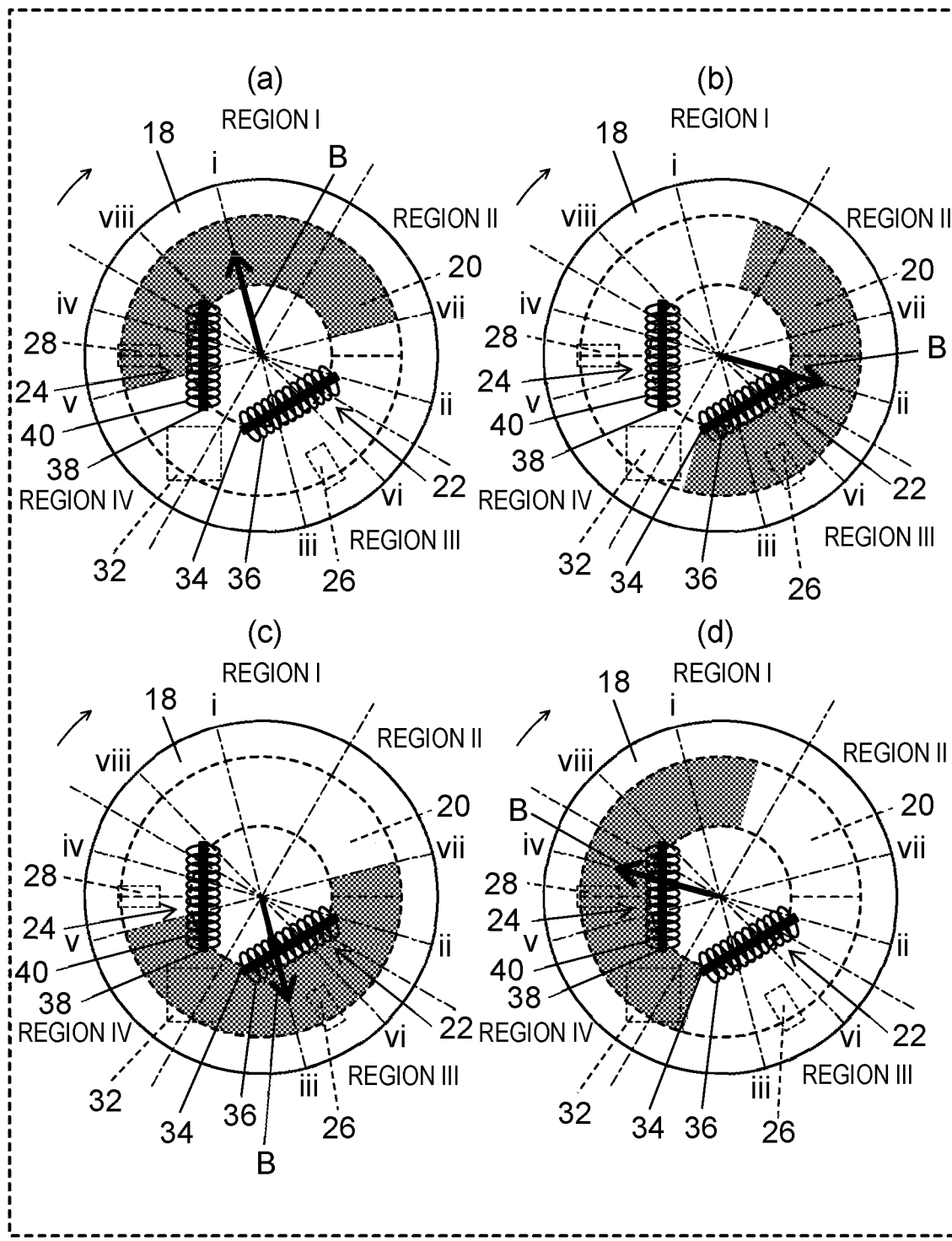
FIG. 4 is a diagram for describing an example of a determination operation of the rotation detector in FIG. 1 in a case where a rotary shaft rotates clockwise.

FIG. 4 is a diagram for describing an example of a determination operation of rotation detector 14 when rotary shaft 10 rotates clockwise. For example, position i illustrated in FIG. 4 is an example of the first position where one power generation element 22 out of the plurality of power generation elements 24, 22 generates power when rotary shaft 10 rotates clockwise. Position viii illustrated in FIG. 4 is an example of the second position closest to position i among one or more positions vi and viii where one power generation element 22 generates power when rotary shaft 10 rotates counterclockwise. The angular interval between position i and position viii in the rotation direction of rotary shaft 10 is 30 degrees, and the plurality of power generation elements 22, 24 are disposed with an angular interval of 30 degrees or more in the rotation direction of rotary shaft 10. In this exemplary embodiment, the plurality of power generation elements 22, 24 are disposed at an angular interval of 120 degrees in the rotation direction of rotary shaft 10.

Note that, for example, the angular interval between power generation element 22 and power generation element 24 in the rotation direction of rotary shaft 10 is an angle formed by a center line extending in the radial direction (refer to arrow Y in FIG. 2) around rotation axis line A and passing through the center of magnetism sensing portion 34 of power generation element 22 in the longitudinal direction and a center line extending in the radial direction around rotation axis line A and passing through the center of magnetism sensing portion 38 of power generation element 24 in the longitudinal direction.

Power generation element 22 extends in a tangential direction of the rotation direction of rotary shaft 10, and is disposed on the main surface of substrate 18 on the side opposite to rotary shaft 10 (the side opposite to rotary plate 16). Power generation element 22 includes magnetism sensing portion 34 and coil 36 wound around magnetism sensing portion 34. Magnetism sensing portion 34 is a magnetic body extending in the tangential direction of the rotation direction of rotary shaft 10, and is located on the side of substrate 18 opposite to rotary plate 16. For example, magnetism sensing portion 34 is a magnetic body that exhibits a large Barkhausen effect, and is a Wiegand wire extending in the tangential direction of the rotation direction of rotary shaft 10. A Wiegand wire is a magnetic body in which when a magnetic field of a predetermined value or more is applied in a longitudinal direction of the Wiegand wire, magnetization directions are aligned to be directed to one side in the longitudinal direction. When a direction of the magnetic flux flowing in the longitudinal direction of the Wiegand wire changes, the magnetization direction of the Wiegand wire is rapidly reversed and a voltage pulse is induced across a coil wound around the Wiegand wire. As described above, power generation element 22 generates power.

Power generation element 24 extends in the tangential direction of the rotation direction of rotary shaft 10, and is disposed on the main surface of substrate 18 on the side opposite to rotary shaft 10 (the side opposite to rotary plate 16). Power generation element 24 includes magnetism sensing portion 38 and coil 40 wound around magnetism sensing portion 38. Magnetism sensing portion 38 is a magnetic body extending in the tangential direction of the rotation direction of rotary shaft 10, and is located on the side of substrate 18 opposite to rotary plate 16. For example, magnetism sensing portion 38 is a magnetic body that exhibits the large Barkhausen effect, and is a Wiegand wire extending in the tangential direction of the rotation direction of rotary shaft 10. Power generation element 24 generates power in the same manner as power generation element 22.

A plurality of magnetic sensors 26, 28 are provided to correspond to the plurality of power generation elements 22, 24, respectively. Magnetic sensor 26 is provided corresponding to power generation element 22, and operates based on the power generated by power generation element 22. Magnetic sensor 28 is provided corresponding to power generation element 24, and operates based on the power generated by power generation element 24. The plurality of magnetic sensors 26, 28 are disposed on the main surface of substrate 18 on rotary shaft 10 side (rotary plate 16 side).

The plurality of magnetic sensors 26, 28 are disposed with a phase difference in the rotation direction of rotary shaft 10. Specifically, each of the plurality of magnetic sensors 26, 28 is disposed at the same position as the corresponding power generation element among the plurality of power generation elements 22, 24 in the rotation direction of rotary shaft 10.

Magnetic sensor 26 is disposed at the same position as power generation element 22 in the rotation direction of rotary shaft 10. For example, magnetic sensor 26 is disposed such that the center of magnetic sensor 26 is located on a center line extending in the radial direction about rotation axis line A and passing through the center of magnetism sensing portion 34 of power generation element 22 in the longitudinal direction. Magnetic sensor 26 is disposed side by side with power generation element 22 and outside power generation element 22 in the radial direction around rotation axis line A.

Magnetic sensor 28 is disposed at the same position as power generation element 24 in the rotation direction of rotary shaft 10. For example, magnetic sensor 28 is disposed such that the center of magnetic sensor 28 is located on a center line extending in the radial direction about rotation axis line A and passing through the center of magnetism sensing portion 38 of power generation element 24 in the longitudinal direction. Magnetic sensor 28 is disposed side by side with power generation element 24 and outside power generation element 24 in the radial direction around rotation axis line A.

Optical sensor 30 is an optical encoder that includes light emission and reception element 42 and reflection pattern 44 and detects a rotation amount of rotary shaft 10.

Figure 3:
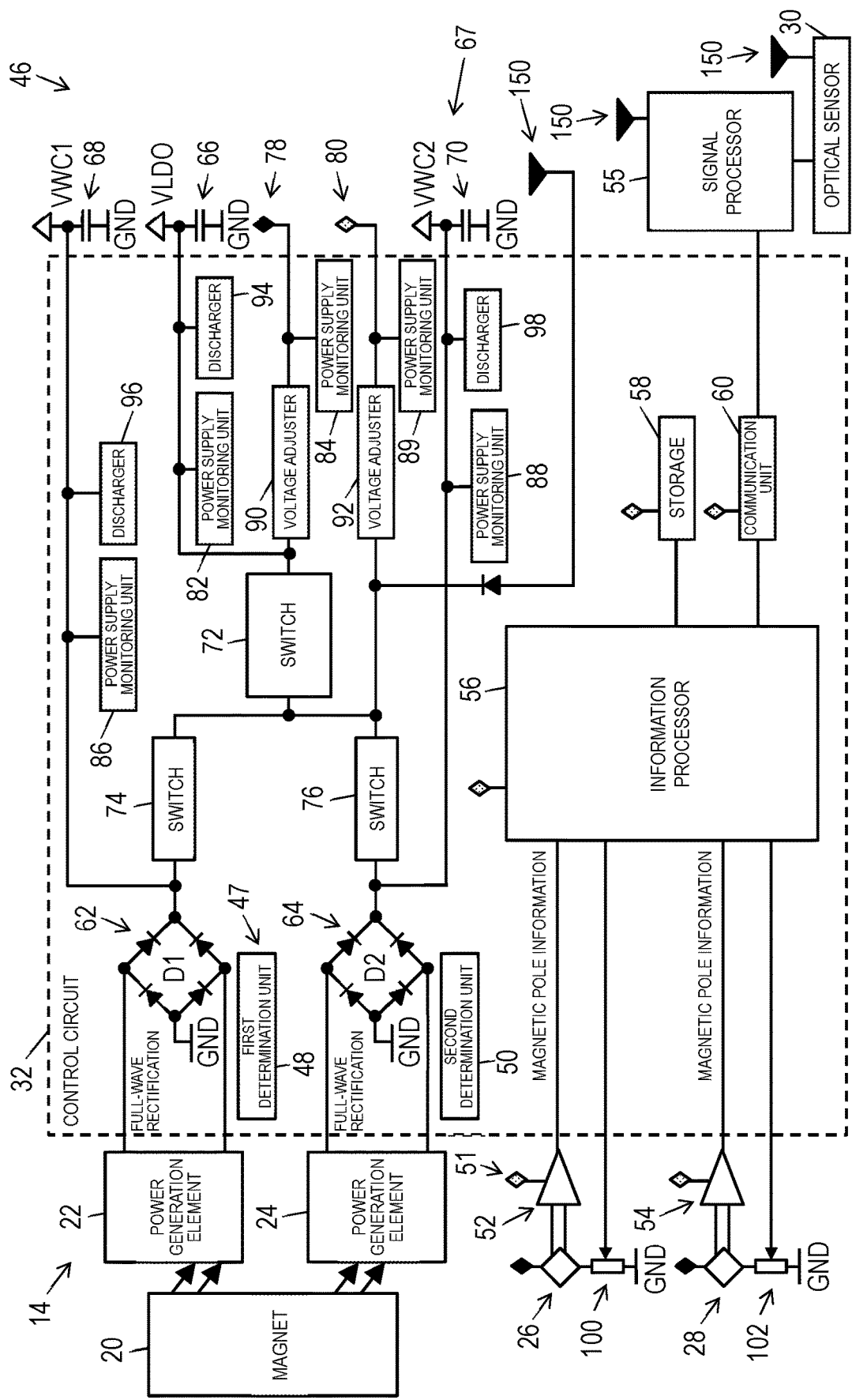
FIG. 3 is a block diagram illustrating a functional configuration of the rotation detector in FIG. 1.

Light emission and reception element 42 is disposed on the main surface of substrate 18 on the side of rotary plate 16 and operates based on power from an external power supply 150 (refer to the functional block diagram illustrated in FIG. 3). Light emission and reception element 42 faces reflection pattern 44 in the rotation axis line direction and emits light toward reflection pattern 44. Light emission and reception element 42 receives the light reflected by reflection pattern 44. The light reflected by reflection pattern 44 changes according to a rotational position of rotary shaft 10. Optical sensor 30 detects a rotation amount of rotary shaft 10 based on the light reflected by reflection pattern 44. In the present exemplary embodiment, light emission and reception element 42 corresponds to a light emission element and a light reception element.

Reflection pattern 44 is disposed on the main surface of rotary plate 16 on substrate 18 side. Reflection pattern 44 is disposed in the rotation direction of rotary shaft 10 and has an annular shape. For example, reflection pattern 44 has a reflection region that easily reflects light and a non-reflection region that hardly reflects light. For example, the reflection region and the non-reflection region are alternately disposed in the rotation direction of rotary shaft 10.

Control circuit 32 is disposed on the main surface of substrate 18 on rotary shaft 10 side (rotary plate 16 side), and is electrically connected to power generation element 22 and the like.

FIG. 3 is a block diagram illustrating a functional configuration of rotation detector 14 in FIG. 1.

As illustrated in FIG. 3, rotation detector 14 further includes generated power supply unit 46, polarity determination unit 47, magnetic pole determination unit 51, signal processor 55, information processor 56, storage 58, and communication unit 60.

Generated power supply unit 46 supplies power generated by each of the plurality of power generation elements 22, 24 to only a magnetic sensor corresponding to the power generation element among the plurality of magnetic sensors 26, 28. For example, generated power supply unit 46 supplies the power generated by power generation element 22 only to magnetic sensor 26 among the plurality of magnetic sensors 26, 28, and supplies the power generated by power generation element 24 to only magnetic sensor 28 among the plurality of magnetic sensors 26, 28.

Generated power supply unit 46 includes a plurality of full-wave rectifiers 62, 64, sensor power storage 66, power storage 67, a plurality of switches 72, 74, 76, a plurality of internal power supplies 78, 80, a plurality of power supply monitoring units 82, 84, 86, 88, 89, a plurality of voltage adjusters 90, 92, a plurality of dischargers 94, 96, 98, and a plurality of switches 100, 102.

Full-wave rectifier 62 is connected to power generation element 22 and rectifies the voltage pulse generated by power generation element 22. Full-wave rectifier 64 is connected to power generation element 24 and rectifies a voltage pulse generated by power generation element 24.

Sensor power storage 66 stores power generated from each of the plurality of power generation elements 22, 24 and supplied to a magnetic sensor corresponding to the power generation element among the plurality of magnetic sensors 26, 28. In a case where power generation element 22 generates power, sensor power storage 66 stores the power generated from power generation element 22 and supplied to magnetic sensor 26. In a case where power generation element 24 generates power, sensor power storage 66 stores the power generated from power generation element 24 and supplied to magnetic sensor 28.

Power storage 67 stores power generated by each of the plurality of power generation elements 22, 24 and supplied to constituent elements than the plurality of magnetic sensors 26, 28. Power storage 67 includes first storage 68 that stores power generated from power generation element 22 and supplied to a constituent element other than magnetic sensor 26, and second storage 70 that stores power generated from power generation element 24 and supplied to a constituent element other than magnetic sensor 28.

Switch 72 is an example of a disconnection unit capable of electrically disconnecting sensor power storage 66 and power storage 67. When neither power generation element 22 or power generation element 24 generates power, switch 72 is brought into an OFF state in which power is cut off, and electrically disconnects sensor power storage 66 and power storage 67. Switch 72 is brought into an ON state in which power can be transmitted in a period in which one of power generation element 22 and power generation element 24 is generating power. Switch 74 is brought into an OFF state in which power is cut off when power generation element 22 is not generating power, and is brought into an ON state in which power can be transmitted in a period in which power generation element 22 is generating power. Switch 76 is brought into an OFF state in which power is cut off when power generation element 24 is not generating power, and is brought into an ON state in which power can be transmitted in a period in which power generation element 24 is generating power.

Internal power supply 78 is a power supply that receives the supply of power stored in sensor power storage 66 and supplies the power to magnetic sensor 26 or magnetic sensor 28. Internal power supply 80 is a power supply that receives the supply of power stored in power storage 67 and supplies the power to, for example, information processor 56 other than the plurality of magnetic sensors 26, 28.

Power supply monitoring unit 82 monitors power between sensor power storage 66 and voltage adjuster 90. Power supply monitoring unit 84 monitors power between voltage adjuster 90 and internal power supply 78. Power supply monitoring unit 86 monitors power between full-wave rectifier 62 and first storage 68. Power supply monitoring unit 88 monitors power between full-wave rectifier 64 and second storage 70. Power supply monitoring unit 89 monitors power between voltage adjuster 92 and internal power supply 80.

Voltage adjuster 90 outputs a constant voltage with the ground potential as a reference potential and a voltage between terminals of a capacitor of sensor power storage 66 as an input voltage. The output voltage of voltage adjuster 90 is supplied to internal power supply 78. Voltage adjuster 92 outputs a constant voltage with the ground potential as a reference potential and a voltage between terminals of a capacitor of first storage 68 or second storage 70 as an input voltage. The output voltage of voltage adjuster 92 is supplied to internal power supply 80. For example, each of the plurality of voltage adjusters 90, 92 is a low drop out (LDO) regulator.

Discharger 94 discharges the power stored in sensor power storage 66 when power generation element 22 and power generation element 24 are not generating power. Discharger 96 discharges the power stored in first storage 68 when power generation element 22 is not generating power. Discharger 98 discharges the power stored in second storage 70 when power generation element 24 is not generating power.

When power generation element 22 is not generating power, switch 100 is brought into an OFF state in which power from internal power supply 78 is cut off not to be supplied to magnetic sensor 26, and into an ON state in which the power from internal power supply 78 can be transmitted to magnetic sensor 26 in a period in which power generation element 22 generates power. When power generation element 24 is not generating power, switch 102 is brought into an OFF state in which power from internal power supply 78 is cut off not to be supplied to magnetic sensor 28, and into an ON state in which the power from internal power supply 78 can be transmitted to magnetic sensor 28 in a period in which power generation element 24 is generating power.

Polarity determination unit 47 determines a polarity of the power generated by each of the plurality of power generation elements 22, 24. Polarity determination unit 47 includes first determination portion 48 that determines a polarity of the power generated by power generation element 22 and second determination portion 50 that determines a polarity of the power generated by power generation element 24.

Magnetic pole determination unit 51 determines a magnetic pole detected by each of the plurality of magnetic sensors 26, 28. Magnetic pole determination unit 51 includes first determination portion 52 that determines a magnetic pole detected by magnetic sensor 26 and second determination portion 54 that determines a magnetic pole detected by magnetic sensor 28.

Signal processor 55 is driven based on power from external power supply 150, and transmits a detection result from optical sensor 30 to information processor 56.

Information processor 56 determines a rotational position of rotary shaft 10 by using the plurality of magnetic sensors 26, 28. The determination of a rotational position of rotary shaft 10 using information processor 56 will be described later.

Storage 58 stores a rotational position, a rotation direction, and the like of rotary shaft 10. For example, storage 58 is configured by a non-volatile memory such as an FRAM (registered trademark).

Communication unit 60 connects information processor 56 and signal processor 55 to be capable of performing wired communication or wireless communication.

FIG. 4 is a diagram for describing an example of a determination operation of rotation detector 14 in FIG. 1 when rotary shaft 10 rotates clockwise. Part (a) of FIG. 4 illustrates a state in which reference position B is located at position i, part (b) of FIG. 4 illustrates a state in which reference position B is located at position ii, part (c) of FIG. 4 illustrates a state in which reference position B is located at position iii, and part (d) of FIG. 4 illustrates a state in which reference position B is located at position iv.

Figure 5:
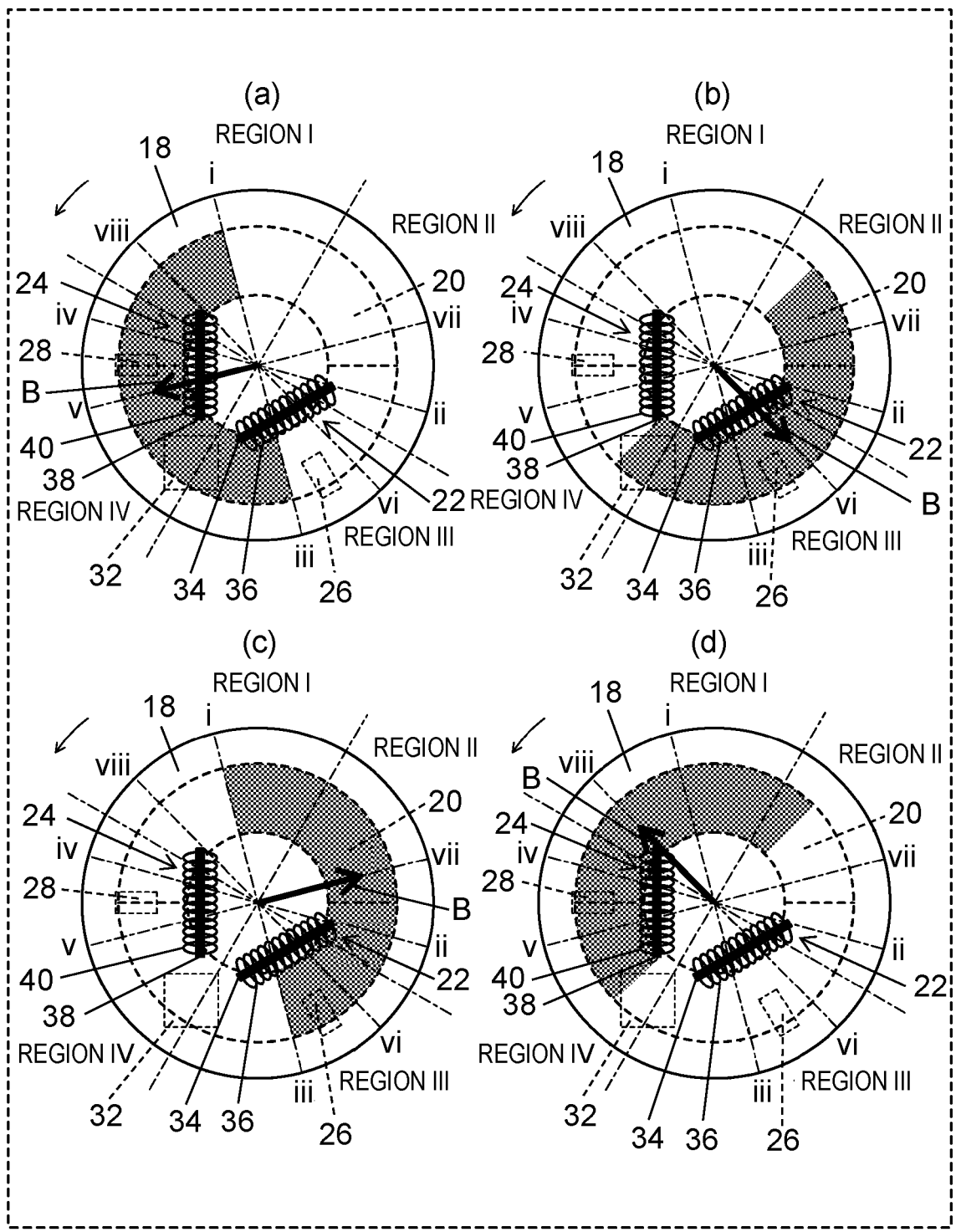
FIG. 5 is a diagram for describing an example of a determination operation of the rotation detector in FIG. 1 in a case where the rotary shaft rotates counterclockwise.

FIG. 5 is a diagram for describing an example of a determination operation of rotation detector 14 in FIG. 1 when rotary shaft 10 rotates counterclockwise. Part (a) of FIG. 5 illustrates a state in which reference position B is located at position v, part (b) of FIG. 5 illustrates a state in which reference position B is located at position vi, part (c) of FIG. 5 illustrates a state in which reference position B is located at position vii, and part (d) of FIG. 5 illustrates a state in which reference position B is located at position viii.

Reference position B is a reference position in the rotation direction of rotary shaft 10, and in the present exemplary embodiment, the center of the N pole in the rotation direction of rotary shaft 10 is set as a reference position.

First, a case where rotary shaft 10 rotates clockwise will be described with reference to FIG. 4. In this case, when reference position B is located at position i, position ii, position iii, and position iv, one of power generation element 22 and power generation element 24 generates power.

For example, in a case where rotary shaft 10 rotates clockwise and reference position B is located at position i as illustrated in (a) of FIG. 4, the direction of the magnetic field in the longitudinal direction of power generation element 22 is reversed by the magnetic field of magnet 20, and power generation element 22 generates power. On the other hand, in a case where reference position B is located at position i, the direction of the magnetic field in the longitudinal direction of power generation element 24 is not reversed by the magnetic field of magnet 20, and power generation element 24 does not generate power.

When power generation element 22 generates power, magnetic sensor 26 operates based on the power from power generation element 22. When reference position B is located at position i, magnetic sensor 26 faces the S pole. Therefore, when reference position B is located at position i, magnetic sensor 26 outputs a signal indicating that reference position B faces the S pole.

When rotary shaft 10 further rotates clockwise and reference position B is located at position ii as illustrated in part (b) of FIG. 4, the direction of the magnetic field in the longitudinal direction of power generation element 24 is reversed by the magnetic field of magnet 20, and power generation element 24 generates power. On the other hand, when reference position B is located at position ii, the direction of the magnetic field in the longitudinal direction of power generation element 22 is not reversed by the magnetic field of magnet 20, and power generation element 22 does not generate power.

When power generation element 24 generates power, magnetic sensor 28 operates based on the power from power generation element 24. When reference position B is located at position ii, magnetic sensor 28 faces the S pole. Therefore, when reference position B is located at position ii, magnetic sensor 28 outputs a signal indicating that reference position B faces the S pole.

When rotary shaft 10 further rotates clockwise and reference position B is located at position iii as illustrated in part (c) of FIG. 4, the direction of the magnetic field in the longitudinal direction of power generation element 22 is reversed by the magnetic field of magnet 20, and power generation element 22 generates power. On the other hand, when reference position B is located at position iii, the direction of the magnetic field in the longitudinal direction of power generation element 24 is not reversed by the magnetic field of magnet 20, and power generation element 24 does not generate power.

When power generation element 22 generates power, magnetic sensor 26 operates based on the power from power generation element 22. When reference position B is located at position iii, magnetic sensor 26 faces the N pole. Therefore, when reference position B is located at position iii, magnetic sensor 26 outputs a signal indicating that reference position B faces the N pole.

In a case where rotary shaft 10 further rotates counterclockwise and reference position B is located at position iv as illustrated in (d) of FIG. 4, the direction of the magnetic field in the longitudinal direction of power generation element 24 is reversed by the magnetic field of magnet 20, and power generation element 24 generates power. On the other hand, in a case where reference position B is located at position iv, the direction of the magnetic field in the longitudinal direction of power generation element 22 is not reversed by the magnetic field of magnet 20, and power generation element 22 does not generate power.

When power generation element 24 generates power, magnetic sensor 28 operates based on the power from power generation element 24. When reference position B is located at position iv, magnetic sensor 28 faces the N pole. Therefore, when reference position B is located at position iv, magnetic sensor 28 outputs a signal indicating that reference position B faces the N pole.

Next, a case where rotary shaft 10 rotates counterclockwise will be described with reference to FIG. 5. In this case, when reference position B is located at position v, position vi, position vii, and position viii, one of power generation element 22 and power generation element 24 generates power.

For example, when rotary shaft 10 rotates counterclockwise and reference position B is located at position v as illustrated in (a) of FIG. 5, the direction of the magnetic field in the longitudinal direction of power generation element 24 is reversed by the magnetic field of magnet 20, and power generation element 24 generates power. On the other hand, in a case where reference position B is located at position v, the direction of the magnetic field in the longitudinal direction of power generation element 22 is not reversed by the magnetic field of magnet 20, and power generation element 22 does not generate power.

When power generation element 24 generates power, magnetic sensor 28 operates based on the power from power generation element 24. When reference position B is located at position v, magnetic sensor 28 faces the N pole. Therefore, when reference position B is located at position v, magnetic sensor 28 outputs a signal indicating that the reference position faces the N pole.

In a case where rotary shaft 10 further rotates counterclockwise and reference position B is located at position vi as illustrated in part (b) of FIG. 5, the direction of the magnetic field in the longitudinal direction of power generation element 22 is reversed by the magnetic field of magnet 20, and power generation element 22 generates power. On the other hand, when reference position B is located at position vi, the direction of the magnetic field in the longitudinal direction of power generation element 24 is not reversed by the magnetic field of magnet 20, and power generation element 24 does not generate power.

When power generation element 22 generates power, magnetic sensor 26 operates based on the power from power generation element 22. When reference position B is located at position vi, magnetic sensor 26 faces the N pole. Therefore, when reference position B is located at position vi, magnetic sensor 26 outputs a signal indicating that the magnetic sensor faces the N pole.

In a case where rotary shaft 10 further rotates counterclockwise and reference position B is located at position vii as illustrated in part (c) of FIG. 5, the direction of the magnetic field in the longitudinal direction of power generation element 24 is reversed by the magnetic field of magnet 20, and power generation element 24 generates power. On the other hand, when reference position B is located at position vii, the direction of the magnetic field in the longitudinal direction of power generation element 22 is not reversed by the magnetic field of magnet 20, and power generation element 22 does not generate power.

When power generation element 24 generates power, magnetic sensor 28 operates based on the power from power generation element 24. When reference position B is located at position vii, magnetic sensor 28 faces the S pole. Therefore, when reference position B is located at position vii, magnetic sensor 28 outputs a signal indicating that magnetic sensor B faces the S pole.

In a case where rotary shaft 10 further rotates counterclockwise and reference position B is located at position viii as illustrated in part (d) of FIG. 5, the direction of the magnetic field in the longitudinal direction of power generation element 22 is reversed by the magnetic field of magnet 20, and power generation element 22 generates power. On the other hand, when reference position B is located at position viii, the direction of the magnetic field in the longitudinal direction of power generation element 24 is not reversed by the magnetic field of magnet 20, and power generation element 24 does not generate power.

When power generation element 22 generates power, magnetic sensor 26 operates based on the power from power generation element 22. When reference position B is located at position viii, magnetic sensor 26 faces the S pole. Therefore, when reference position B is located at position viii, magnetic sensor 26 outputs a signal indicating that magnetic sensor B faces the S pole.

For example, information processor 56 determines a rotational position of rotary shaft 10 by determining in which region among the plurality of regions I to IV arranged in the rotation direction of rotary shaft 10 reference position B in the rotation direction of rotary shaft 10 is located based on power generation information indicating a power generation element that has generated power among the plurality of power generation elements 22, 24 and detection information indicating a detection result from the magnetic sensor corresponding to the power generation element among the plurality of magnetic sensors 26, 28. Storage 58 stores a region in which reference position B is determined to be located by information processor 56 among the plurality of regions I to IV.

For example, the power generation information is 2-bit information indicating 1 in a case where power generation element 22 has generated power and indicating 0 in a case where power generation element 24 has generated power. For example, the detection information is 2-bit information indicating 1 in a case where magnetic sensor 26 has detected the S pole and magnetic sensor 28 has detected the S pole, and indicating 0 in a case where magnetic sensor 26 has detected the N pole and magnetic sensor 28 has detected the N pole.

For example, each of the plurality of regions I to IV is a region that extends in the radial direction about rotation axis line A and is sandwiched between two adjacent straight lines among a plurality of straight lines arranged at equal intervals in the rotation direction of rotary shaft 10. In the present exemplary embodiment, a region including position i and position viii is set as region I, a region including position ii and position vii is set as region II, a region including position iii and position vi is set as region III, and a region including position iv and position v is set as region IV.

As described above, in a case where reference position B is located at position i, power generation element 22 generates power, and magnetic sensor 26 detects the S pole. In a case where reference position B is located at position viii, power generation element 22 generates power, and magnetic sensor 26 detects the S pole. That is, in these cases, (detection information, power generation information)=(1, 1). Therefore, in a case of (detection information, power generation information)=(1, 1), information processor 56 determines that reference position B is located at position i or in the vicinity of position viii, and reference position B is located in region I.

In a case where reference position B is located at position ii, power generation element 24 generates power, and magnetic sensor 28 detects the S pole. In a case where reference position B is located at position vii, power generation element 24 generates power, and magnetic sensor 28 detects the S pole. That is, in these cases, (detection information, power generation information)=(1, 0). Therefore, in a case of (detection information, power generation information)=(1, 0), information processor 56 determines that reference position B is located at position ii or in the vicinity of position vii, and reference position B is located in region II.

When reference position B is located at position iii, power generation element 22 generates power, and magnetic sensor 26 detects the N pole. When reference position B is located at position vi, power generation element 22 generates power, and magnetic sensor 26 detects the N pole. That is, in these cases, (detection information, power generation information)=(0, 1). Therefore, in a case of (detection information, power generation information)=(0, 1), information processor 56 determines that reference position B is located at position iii or in the vicinity of position vi, and reference position B is located in region III.

In a case where reference position B is located at position iv, power generation element 24 generates power, and magnetic sensor 28 detects the N pole. In a case where reference position B is located at position v, power generation element 24 generates power, and magnetic sensor 28 detects the N pole. That is, in these cases, (detection information, power generation information)=(0, 0). Therefore, in a case of (detection information, power generation information)=(0, 0), information processor 56 determines that reference position B is located at position iv or in the vicinity of position v, and reference position B is located in region IV.

In a case where a region in which current reference position B is determined to be located is not a region adjacent to a region in which previous reference position B is determined to be located among the plurality of regions I to IV, information processor 56 stores the occurrence of an error in storage 58.

For example, information processor 56 determines a rotational position of rotary shaft 10 every time one of power generation element 22 and power generation element 24 generates power and stores the determined rotational position in storage 58, and in a case where a region in which current reference position B is determined to be located is region I and a region in which previous reference position B is determined to be located is region III, information processor 58 stores the occurrence of an error in storage 58.

In a case where a region in which current reference position B is determined to be located is not a region adjacent to a region in which previous reference position B is determined to be located among the plurality of regions I to IV, information processor 56 stores, in storage 58, that a transition has occurred from the region in which previous reference position B is determined to be located to the region in which current reference position B is determined to be located.

For example, in a case where a region in which current reference position B is determined to be located is region I and a region in which previous reference position B is determined to be located is region III, information processor 56 stores that a transition from region III to region I has occurred in storage 58.

Information processor 56 determines a rotation direction of rotary shaft 10 based on the power generation information, the detection information, and polarity information indicating the polarity determined by polarity determination unit 47.

For example, the polarity information is 2-bit information indicating 1 in a case where the polarity of the power generated by power generation element 22 is negative, and indicating 0 in a case where the polarity of the power generated by power generation element 22 is positive. In other words, for example, the polarity information is 2-bit information indicating 0 in a case where the polarity of the power generated by power generation element 24 is negative, and indicating 1 in a case where the polarity of the power generated by power generation element 24 is positive.

For example, the polarity of the power generated by power generation element 22 in a case where reference position B is located at position i and the polarity of the power generated by power generation element 22 in a case where reference position B is located at position viii are reversed. For example, when the polarity of the power generated by power generation element 22 in a case where reference position B is located at position i is positive, and the polarity of the power generated by power generation element 22 in a case where reference position B is located at position viii is negative, information processor 56 can determine that rotary shaft 10 rotates clockwise in a case where the polarity information is 0, and can determine that rotary shaft 10 rotates counterclockwise in a case where the polarity information is 1.

In a case where the region in which current reference position B is determined to be located among the plurality of regions I to IV is adjacent to the region in which previous reference position B is determined to be located, and the transition from the polarity determined by the previous polarity determination unit 47 to the polarity determined by the current polarity determination unit 47 is not normal, information processor 56 stores the occurrence of an error in storage 58.

Table 1 is a table illustrating a relationship between power generation positions of the plurality of power generation elements 22, 24 of rotation detector 14 in FIG. 1, a rotation direction of rotary shaft 10, and the like. As illustrated in Table 1, for example, the polarity information indicates 0 in a case where reference position B is located at position i, indicates 0 in a case where reference position B is located at position ii, indicates 1 in a case where reference position B is located at position iii, and indicates 1 in a case where reference position B is located at position iv. For example, the polarity information indicates 0 in a case where reference position B is located at position v, indicates 0 in a case where reference position B is located at position vi, indicates 1 in a case where reference position B is located at position vii, and indicates 1 in a case where reference position B is located at position viii.

TABLE 1

| Rotational position | Rotation direction-region | Polarity information |
|---|---|---|
| i | CW-I | 0 |
| ii | CW-II | 0 |
| iii | CW-III | 1 |
| iv | CW-IV | 1 |
| v | CCW-IV | 0 |
| vi | CCW-III | 0 |

TABLE 1-continued

| Rotational position | Rotation direction-region | Polarity information |
|---|---|---|
| vii | CCW-II | 1 |
| viii | CCW-I | 1 |

For example, in a case where a region in which current reference position B is determined to be located is region I, and a region in which previous reference position B is determined to be located is region II, when the polarity information has transitioned from 1 to 1, information processor 56 can ascertain that rotary shaft 10 has rotated counterclockwise and reference position B has moved from region II to region I, and can determine that the detection of the rotational position of rotary shaft 10 is normal. On the other hand, in a case where a region in which current reference position B is determined to be located is region I and a region in which previous reference position B is determined to be located is region II, when the polarity information has transitioned from 0 to 0, information processor 56 can ascertain that rotary shaft 10 has rotated clockwise and reference position B has moved from region II to region I, cannot determine that reference position B is located in region III and region IV, and can determine that the detection of the rotational position of rotary shaft 10 is abnormal. Therefore, in a case where a region in which current reference position B is determined to be located is region I and a region in which previous reference position B is determined to be located is region II, when the polarity information has transitioned from 0 to 0, information processor 56 determines that the transition from the previous polarity determined by polarity determination unit 47 to the current polarity determined by polarity determination unit 47 is not normal, and stores the occurrence of an error in storage 58.

In a case where optical sensor 30 switches from a non-power-supply state in which power is not supplied from power supply 150 to a power-supply state in which power is supplied from power supply 150, information processor 56 determines a rotational position of rotary shaft 10 based on a rotational position of rotary shaft 10 determined by using the plurality of magnetic sensors 26, 28 in the non-power-supply state and a rotation amount of rotary shaft 10 detected by optical sensor 30 after the optical sensor switches to the power-supply state.

For example, information processor 56 determines the rotational position of rotary shaft 10 by adding the rotation amount of rotary shaft 10 detected by optical sensor 30 after the optical sensor switches to the power-supply state to the rotational position of rotary shaft 10 determined by using the plurality of magnetic sensors 26, 28 immediately before optical sensor 30 switches from the non-power-supply state to the power-supply state.

Information processor 56 updates a count value for calculating a rotation speed of rotary shaft 10 based on the region in which current reference position B is determined to be located among the plurality of regions I to IV, the current polarity determined by polarity determination unit 47, the region in which previous reference position B is determined to be located among the plurality of regions I to IV, and the previous polarity determined by polarity determination unit 47.

Table 2 is a table for describing an example of a count value update operation of rotation detector 14 in FIG. 1.

TABLE 2

| Read from storage | | | Information processor | | | | |
|---|---|---|---|---|---|---|---|
| Previous polarity information | Previous detection information | Previous power generation information | Current polarity information | Current detection information | Current power generation information | Count | State |
| 1 | 0 | 0 | 0 | 1 | 1 | −1 | Normal |
| 1 | 1 | 1 | 0 | 0 | 0 | +1 | Normal |
| 0 | 1 | 1 | 0 | 0 | 0 | +1 | Normal |
| 0 | 0 | 0 | 0 | 1 | 1 | −1 | Normal |

As illustrated in Table 2, for example, in a case where the previous polarity information indicates 1, the previous detection information indicates 0, the previous power generation information indicates 0, the current polarity information indicates 0, the current detection information indicates 1, and the current power generation information indicates 1, it is ascertained that rotary shaft 10 has rotated clockwise and reference position B has moved from region IV to region I, and information processor 56 decrements the count value by 1.

For example, in a case where the previous polarity information indicates 0, the previous detection information indicates 0, the previous power generation information indicates 0, the current polarity information indicates 0, the current detection information indicates 1, and the current power generation information indicates 1, it is ascertained that rotary shaft 10 has rotated clockwise and reference position B has moved from region IV to region I, and information processor 56 decrements the count value by 1.

For example, in a case where the previous polarity information indicates 1, the previous detection information indicates 1, the previous power generation information indicates 1, the current polarity information indicates 0, the current detection information indicates 0, and the current power generation information indicates 0, it is ascertained that rotary shaft 10 has rotated counterclockwise and reference position B has moved from region I to region IV, and information processor 56 increments the count value by 1.

For example, in a case where the previous polarity information indicates 0, the previous detection information indicates 1, the previous power generation information indicates 1, the current polarity information indicates 0, the current detection information indicates 0, and the current power generation information indicates 0, it is ascertained that rotary shaft 10 has rotated counterclockwise and reference position B has moved from region I to region IV, and information processor 56 increments the count value by 1.

As described above, information processor 56 can calculate the rotation speed of rotary shaft 10 by updating the count value.

Rotation detector 14 according to the first exemplary embodiment has been described above.

Rotation detector 14 according to the present exemplary embodiment includes magnet 20 that rotates together with rotary shaft 10, a plurality of power generation elements 22, 24 that generate power according to a change in a magnetic field due to the rotation of magnet 20 together with rotary shaft 10, and a plurality of magnetic sensors 26, 28 each provided to a corresponding one of the plurality of power generation elements 22, 24. Rotation detector 14 according to the present exemplary embodiment further includes information processor 56 that determines a rotational position of rotary shaft 10 by using the plurality of magnetic sensors 26, 28, and generated power supply unit 46 that supplies power generated by each of the plurality of power generation elements 22, 24 only to the corresponding one of the plurality of power generation elements 22,24.

According to this, since the power generated by the plurality of power generation elements 22, 24 can be supplied to only a magnetic sensor corresponding to the power generation element among the plurality of magnetic sensors 26, 28, consumption of the power generated by each of the plurality of power generation elements 22, 24 can be suppressed, and the magnetic sensor corresponding to the power generation element can be driven more reliably by using the power. Therefore, it is possible to suppress the occurrence of erroneous detection due to the magnetic sensor corresponding to the power generation element not being driven.

In rotation detector 14 according to the present exemplary embodiment, information processor 56 determines the rotational position of rotary shaft 10, and the rotation detector 14 further includes storage 58 that stores a region in which reference position B is determined to be located by information processor 56 among the plurality of regions I to IV. The determination of rotary shaft 10 is performed by determining in which region among the plurality of regions I to IV arranged in the rotation direction of rotary shaft 10 reference position B in the rotation direction of rotary shaft 10 is located, based on the power generation information indicating a power generation element that has generated power among the plurality of power generation elements 22, 24 and the detection information indicating a detection result from a magnetic sensor corresponding to the power generation element among the plurality of magnetic sensors 26, 28.

According to this, since a rotational position of rotary shaft 10 can be determined by using the power generation information and the detection information without using the polarity of the power generated by each of the plurality of power generation elements 22, 24, even in a case where the power generated by each of the plurality of power generation elements 22, 24 is small and the polarity of the power cannot be determined, a rotational position of rotary shaft 10 can be determined, and the occurrence of erroneous detection can be suppressed.

In rotation detector 14 according to the present exemplary embodiment, in a case where a region in which current reference position B is determined to be located among the plurality of regions I to IV is not a region adjacent to a region in which previous reference position B is determined to be located, information processor 56 stores the occurrence of an error in storage 58.

According to this, in a case where the region in which current reference position B is determined to be located is not a region adjacent to the region in which previous reference position B is determined to be located due to the plurality of magnetic sensors 26, 28 not being driven, and erroneous detection occurs, the occurrence of erroneous detection can be stored, so that the occurrence of erroneous detection can be easily recognized.

In rotation detector 14 according to the present exemplary embodiment, in a case where the region in which current reference position B is determined to be located is not a region adjacent to the region in which previous reference position B is determined to be located among the plurality of regions I to IV, information processor 56 stores, in storage 58, that a transition has occurred from the region in which previous reference position B is determined to be located to the region in which current reference position B is determined to be located.

According to this, since it is possible to easily recognize that erroneous detection has occurred in a case where reference position B transitions from a certain region to another region, it is possible to easily specify a cause of the erroneous detection.

Rotation detector 14 according to the present exemplary embodiment further includes polarity determination unit 47 that determines a polarity of the power generated by each of the plurality of power generation elements 22, 24, and information processor 56 determines a rotation direction of rotary shaft 10 based on the power generation information, the detection information, and the polarity information indicating the polarity determined by polarity determination unit 47.

Accordingly, the occurrence of erroneous detection can be easily recognized by determining the rotation direction of rotary shaft 10 in addition to the rotational position of rotary shaft 10.

In rotation detector 14 according to the present exemplary embodiment, in a case where the region in which current reference position B is determined to be located among the plurality of regions I to IV is a region adjacent to the region in which previous reference position B is determined to be located, when a transition from the previous polarity determined by polarity determination unit 47 to the current polarity determined by polarity determination unit 47 is not normal, information processor 56 stores the occurrence of an error in storage 58.

According to this, when erroneous detection occurs due to, for example, the plurality of magnetic sensors 26, 28 not being driven, error information indicating that erroneous detection has occurred can be stored, so that occurrence of erroneous detection can be easily recognized.

In rotation detector 14 according to the present exemplary embodiment, information processor 56 updates a count value for calculating a rotation speed of rotary shaft 10 based on the region in which current reference position B is determined to be located among the plurality of regions I to IV, the current polarity determined by polarity determination unit 47, the region in which previous reference position B is determined to be located among the plurality of regions I to IV, and the previous polarity determined by polarity determination unit 47.

According to this, since a count value for calculating the rotation speed of rotary shaft 10 can be more accurately updated, the occurrence of erroneous detection can be suppressed.

Rotation detector 14 according to the present exemplary embodiment further includes optical sensor 30 that includes light emission and reception element 42 that operates based on power from power supply 150 and detects a rotation amount of rotary shaft 10. In a case where optical sensor 30 switches from the non-power-supply state in which power is not supplied from power supply 150 to the power-supply state in which power is supplied from power supply 150, information processor 56 determines a rotational position of rotary shaft 10 based on a rotational position of rotary shaft 10 determined by using the plurality of magnetic sensors 26, 28 in the non-power-supply state and a rotation amount of rotary shaft 10 detected by optical sensor 30 after the optical sensor switches to the power-supply state.

Accordingly, in the non-power-supply state, a rotational position of rotary shaft 10 can be determined by using the plurality of magnetic sensors 26, 28. When the optical sensor switches from the non-power-supply state to the power-supply state, a rotational position of rotary shaft 10 can be determined by adding the rotation amount of rotary shaft 10 detected by optical sensor 30 after the optical sensor switches to the power-supply state to the rotational position of rotary shaft 10 determined by using the plurality of magnetic sensors 26, 28 in the non-power-supply state, so that the occurrence of erroneous detection can be further suppressed.

In rotation detector 14 according to the present exemplary embodiment, generated power supply unit 46 includes sensor power storage 66, power storage 67, and switch 72. Sensor power storage 66 stores power generated from each of the plurality of power generation elements 22, 24 and supplied to a magnetic sensor corresponding to the power generation element among the plurality of magnetic sensors 26, 28. Power storage 67 stores power generated by each of the plurality of power generation elements 22, 24 and supplied to constituent elements than the plurality of magnetic sensors 26, 28. Switch 72 enables sensor power storage 66 and power storage 67 to be electrically disconnected.

According to this, since power generated from each of the plurality of power generation elements 22, 24 can be reliably supplied by using a corresponding magnetic sensor among the plurality of magnetic sensors 26, 28, the occurrence of erroneous detection due to the magnetic sensor not being driven can be further suppressed.

In rotation detector 14 according to the present exemplary embodiment, the plurality of power generation elements 22, 24 are disposed with an angular interval larger than or equal to an angular interval between a first position where one power generation element among the plurality of power generation elements 22, 24 generates power when the rotary shaft 10 rotates clockwise and a second position closest to the first position among one or more positions where the one power generation element generates power when rotary shaft 10 rotates counterclockwise in the rotation direction of rotary shaft 10. Each of the plurality of magnetic sensors 26, 28 is disposed at the same position as a corresponding power generation element among the plurality of power generation elements 22, 24 in the rotation direction of rotary shaft 10.

According to this, since a magnetic pole detected by magnetic sensor 26 when power generation element 22 generates power at a certain position and a magnetic pole detected by magnetic sensor 26 when power generation element 22 generates power at another position can be easily made different from each other, a rotational position of rotary shaft 10 can be easily determined, and the occurrence of erroneous detection can be suppressed.

Second Exemplary Embodiment

Figure 6:
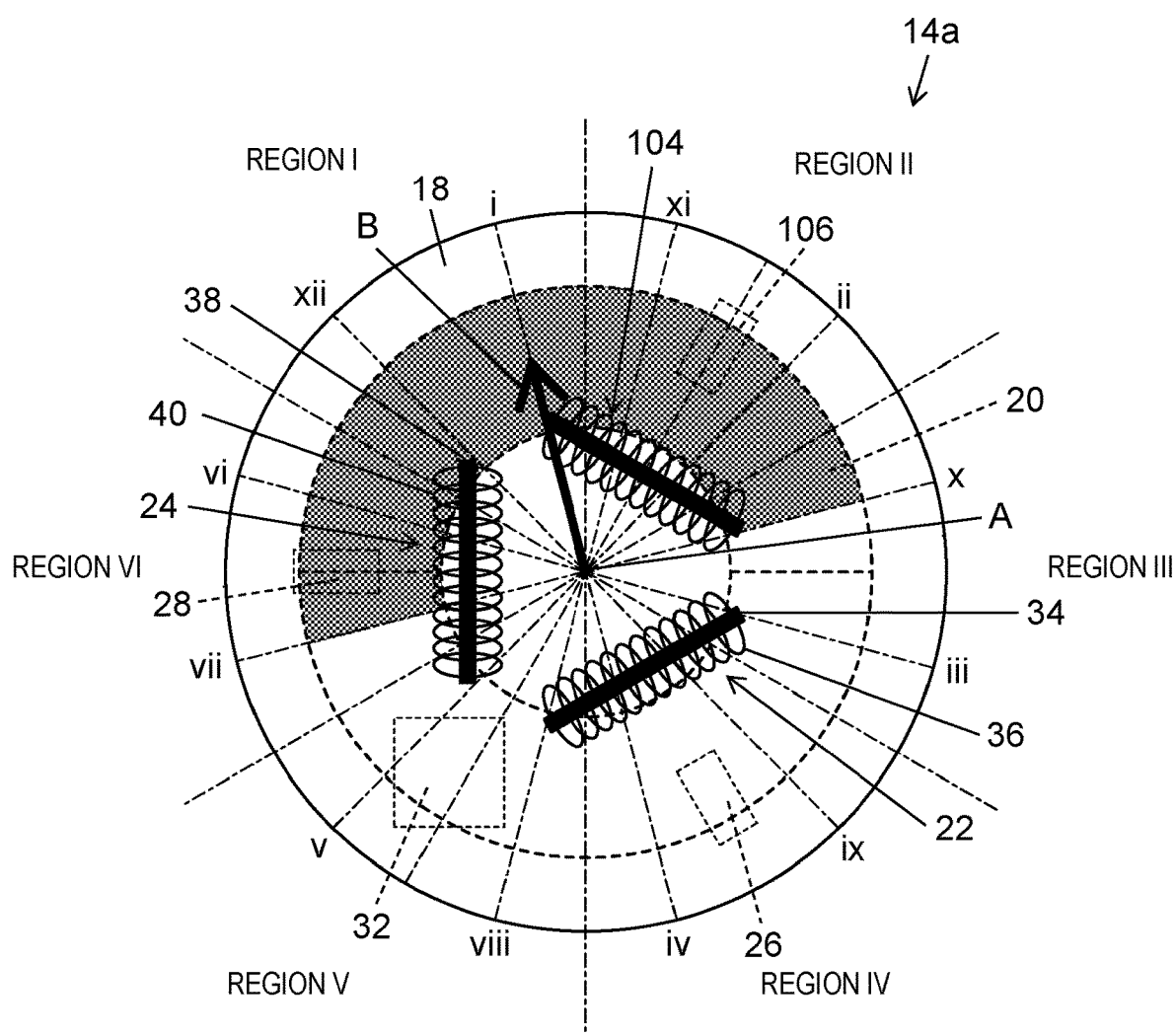
FIG. 6 is a diagram illustrating a rotation detector according to a second exemplary embodiment.

FIG. 6 is a diagram illustrating rotation detector 14a according to a second exemplary embodiment.

As illustrated in FIG. 6, rotation detector 14a is mainly different from rotation detector 14 in further including power generation element 104 and magnetic sensor 106.

Since power generation element 104 has the same configuration as power generation element 22 and power generation element 24, a detailed description of power generation element 104 will be omitted. A plurality of power generation elements 22, 24, 104 are disposed at equal intervals in the rotation direction of rotary shaft 10.

Since magnetic sensor 106 has the same configuration as magnetic sensor 26 and magnetic sensor 28, a detailed description of magnetic sensor 106 will be omitted. Magnetic sensor 106 is disposed at the same position as power generation element 104 in the rotation direction of rotary shaft 10, and is disposed outside power generation element 104 side by side with power generation element 104 in the radial direction of rotary shaft 10.

As described above, by further providing power generation element 104 and magnetic sensor 106 corresponding to power generation element 104, it is possible to cause any one of the plurality of power generation elements 22, 24, 104 to generate power at positions i to vi in a case where rotary shaft 10 rotates clockwise, and it is possible to cause any one of the plurality of power generation elements 22, 24, 104 to generate power at positions vii to xii when rotary shaft 10 rotates counterclockwise. As a result, it is possible to determine in which of six regions I to VI reference position B is located, and to more finely detect a position of rotary shaft 10 than rotation detector 14.

Figure 7:
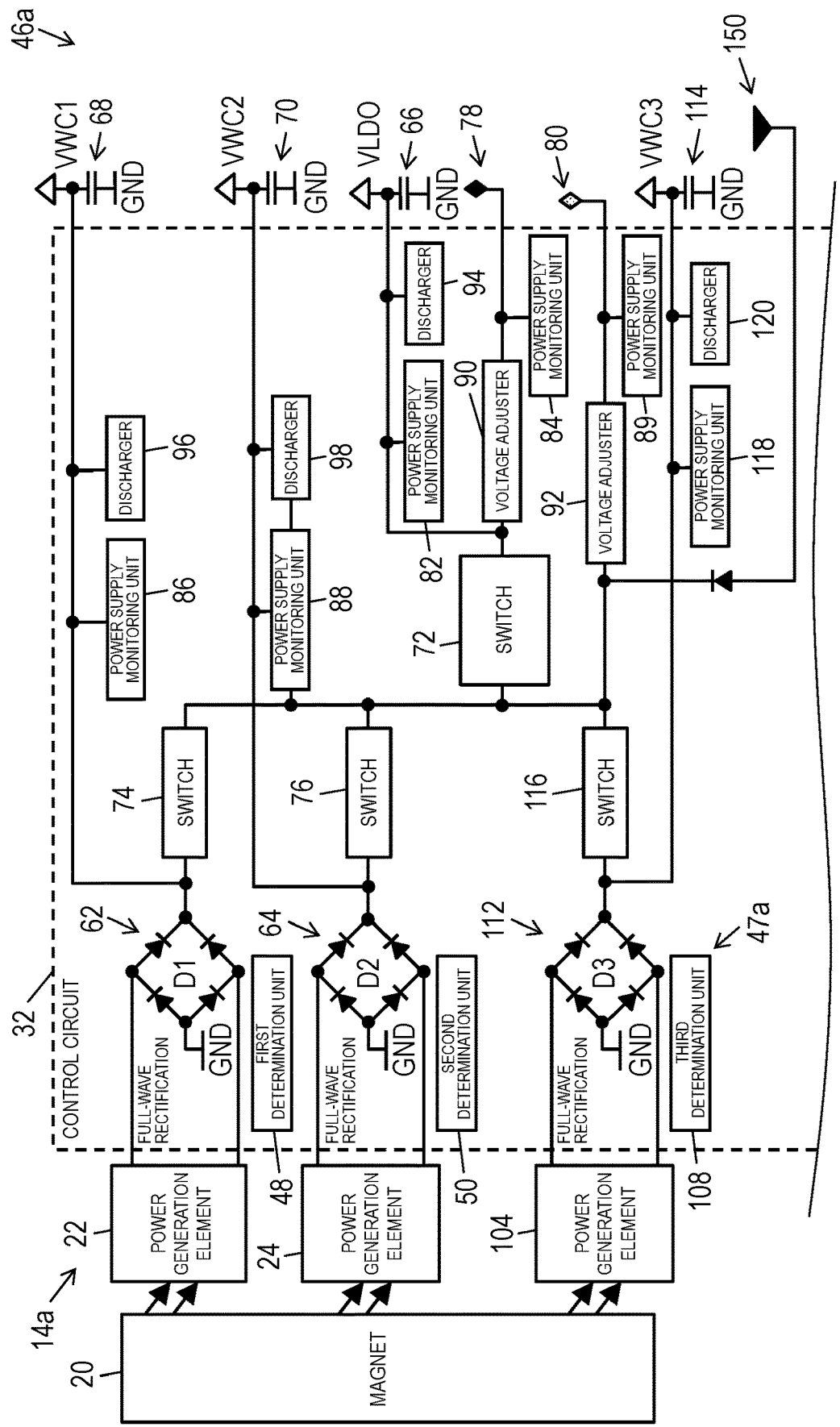
FIG. 7 is a block diagram illustrating a part of a functional configuration of the rotation detector in FIG. 6.

FIG. 7 is a block diagram illustrating a part of a functional configuration of rotation detector 14a in FIG. 6. FIG. 8 is a block diagram illustrating another part of the functional configuration of rotation detector 14a in FIG. 6.

As illustrated in FIGS. 7 and 8, rotation detector 14a is mainly different from rotation detector 14 in including generated power supply unit 46a different from generated power supply unit 46, including polarity determination unit 47a different from polarity determination unit 47, and including magnetic pole determination unit 51a different from the magnetic pole determination unit 51.

Generated power supply unit 46a is mainly different from generated power supply unit 46 in including full-wave rectifier 112, third storage 114, switch 116, power supply monitoring unit 118, discharger 120, and switch 122.

Generated power supply unit 46a can supply power generated by power generation element 104 to only magnetic sensor 106 corresponding to power generation element 104 among the plurality of magnetic sensors 26, 28, 106.

Polarity determination unit 47a is mainly different from polarity determination unit 47 in further including third determination unit 108 that determines a polarity of power generated by power generation element 104. A polarity of power generated from power generation element 104 can be determined by third determination unit 108.

Magnetic pole determination unit 51a is mainly different from magnetic pole determination unit 51 in further including third determination unit 110 that determines a magnetic pole detected by magnetic sensor 106. A magnetic pole detected by magnetic sensor 106 can be determined by third determination unit 110.

Other Exemplary Embodiments and the Like

As described above, the exemplary embodiments have been described as examples of the techniques disclosed in the present application. However, the technique according to the present disclosure is not limited thereto, and can also be applied to exemplary embodiments or modifications in which changes, replacements, additions, omissions, and the like are made as appropriate without departing from the concept of the present disclosure.

In the above-described exemplary embodiments, the case where magnet 20 has an annular shape has been described, but the present invention is not limited thereto. For example, the magnet need not to have an annular shape, and may have a disk shape, a rod shape, or the like.

In the above-described exemplary embodiment, the case where optical sensor 30 includes reflection pattern 44 has been described, but the present invention is not limited thereto. For example, the optical sensor may have a transmission pattern through which light is transmitted, and may detect a rotational position of the rotary shaft by receiving the light transmitted through the transmission pattern.

In the above-described exemplary embodiments, the case where each of the plurality of magnetic sensors 26, 28 is disposed at the same position as a corresponding power generation element among the plurality of power generation elements 22, 24 in the rotation direction of rotary shaft 10 has been described, but the present invention is not limited thereto. For example, each of the plurality of magnetic sensors may be disposed at a position shifted by 180 degrees from a corresponding power generation element among the plurality of power generation elements in the rotation direction of the rotary shaft.

In the above exemplary embodiments, the case where magnetic sensors 26, 28 are disposed side by side with power generation elements 22, 24 and outside power generation elements 22, 24 in the radial direction about rotation axis line A has been described. However, magnetic sensors 26, 28 are not necessarily required to be disposed outside power generation elements 22, 24, and may be disposed inside power generation elements 22, 24. Here, magnetic sensors 26, 28 are required to accurately read the magnetic poles of magnet 20. Therefore, in order to detect a magnetic flux of magnet 20, magnetic sensors 26, 28 are preferably disposed at positions where an S/N ratio is large. Therefore, when magnetic sensors 26, 28 are viewed along rotation axis line A, magnetic sensors 26, 28 are disposed at positions not overlapping power generation elements 22, 24. As a result, there is an advantage that magnetic sensors 26, 28 are not easily affected by a change in the magnetic flux due to power generation of power generation elements 22, 24. In a case where magnetic sensors 26, 28 are disposed outside power generation elements 22, 24, magnetic sensors 26, 28 can be disposed even in a case of a substrate having a hole in the center, so that a central portion of rotation detector 14 can be easily made hollow.

In the above-described exemplary embodiments, the case where the plurality of power generation elements 22, 24 are disposed on the main surface of substrate 18 on the side opposite to rotary plate 16 has been described, but the present invention is not limited thereto. For example, the plurality of power generation elements may be disposed on the main surface of the substrate on the rotary plate side.

In the above-described exemplary embodiments, the case where the plurality of magnetic sensors 26, 28 are disposed on the main surface of substrate 18 on rotary plate 16 side has been described, but the present invention is not limited thereto. For example, the plurality of magnetic sensors may be disposed on the main surface of the substrate on the side opposite to the rotary plate.

In the above-described exemplary embodiment, the case where magnet 20 is disposed on the main surface of rotary plate 16 on the side opposite to substrate 18 has been described, but the present invention is not limited thereto.

For example, the magnet may be disposed on the main surface of the rotary plate on the substrate side.

INDUSTRIAL APPLICABILITY

The rotation detector according to the present disclosure can be used to detect rotation of a rotary shaft or the like of a motor that rotationally drives a load.

REFERENCE MARKS IN THE DRAWINGS 14, 14a: rotation detector
16: rotary plate
18: substrate
20: magnet
22, 24, 104: power generation element
26, 28, 106: magnetic sensor
30: optical sensor
32: control circuit
34, 38: magnetism sensing portion
36, 40: coil
42: light emission and reception element
44: reflection pattern
46, 46a: generated power supply unit
47, 47a: polarity determination unit
48, 52: first determination unit
50, 54: second determination unit
51, 51a: magnetic pole determination unit
55: signal processor
56: information processor
58: storage
60: communication unit
62, 64, 112: full-wave rectifier
66: sensor power storage
67: power storage
68: first storage
70: second storage
72, 74, 76, 100, 102, 116, 122: switch
78, 80: internal power supply
82, 84, 86, 88, 89, 118: power supply monitoring unit
90, 92: voltage adjuster
94, 96, 98, 120: discharger
108, 110: third determination unit
114: third storage

The invention claimed is:

1. A rotation detector comprising:
a magnet that rotates together with a rotary shaft;
a plurality of power generation elements that generate power according to a change in a magnetic field due to rotation of the magnet together with the rotary shaft;
a plurality of magnetic sensors each provided to a corresponding one of the plurality of power generation elements;
an information processor that determines a rotational position of the rotary shaft by using the plurality of magnetic sensors; and a generated power supply unit that supplies power generated by each of the plurality of power generation elements only to the corresponding one of the plurality of magnetic sensors.

2. The rotation detector according to claim 1, wherein the information processor determines the rotational position of the rotary shaft by determining in which region among a plurality of regions arranged in a rotation direction of the rotary shaft a reference position in the rotation direction of the rotary shaft is located, based on power generation information indicating a power generation element that has generated power among the plurality of power generation elements and detection information indicating a detection result from a magnetic sensor corresponding to the power generation element among the plurality of magnetic sensors, and
the rotation detector further comprises a storage that stores a region in which the reference position is determined to be located by the information processor among the plurality of regions.

3. The rotation detector according to claim 2, wherein, in a case where a region in which a current reference position is determined to be located among the plurality of regions is not a region adjacent to a region in which a previous reference position is determined to be located, the information processor stores, in the storage, that an error has occurred.

4. The rotation detector according to claim 2, wherein, in a case where a region in which a current reference position is determined to be located among the plurality of regions is not a region adjacent to a region in which a previous reference position is determined to be located, the information processor stores, in the storage, that a transition from the region in which the previous reference position is determined to be located to the region in which the current reference position is determined to be located has occurred.

5. The rotation detector according to claim 2, further comprising a polarity determination unit that determines a polarity of power generated by each of the plurality of power generation elements, wherein
the information processor determines the rotation direction of the rotary shaft based on the power generation information, the detection information, and polarity information indicating the polarity determined by the polarity determination unit.

6. The rotation detector according to claim 5, wherein, in a case where a region in which a current reference position is determined to be located among the plurality of regions is a region adjacent to a region in which a previous reference position is determined to be located, when a transition from a previous polarity determined by the polarity determination unit to a current polarity determined by the polarity determination unit is not normal, the information processor stores, in the storage, that an error has occurred.

7. The rotation detector according to claim 5, wherein the information processor updates a count value for calculating a rotation speed of the rotary shaft based on a region in which a current reference position is determined to be located among the plurality of regions, a current polarity determined by the polarity determination unit, a region in which a previous reference position is determined to be located among the plurality of regions, and a previous polarity previously determined by the polarity determination unit.

8. The rotation detector according to claim 1, further comprising an optical sensor that includes a light emission element and a light reception element operating based on power from a power supply and detects a rotation amount of the rotary shaft, wherein
in a case where the optical sensor switches from a non-power-supply state in which power is not supplied from the power supply to a power-supply state in which power is supplied from the power supply, the information processor determines the rotational position of the rotary shaft based on a rotational position of the rotary shaft determined by using the plurality of magnetic sensors in the non-power-supply state and a rotation amount of the rotary shaft detected by the optical sensor after the optical sensor switches to the power-supply state.

9. The rotation detector according to claim 1, wherein the generated power supply unit includes
   a sensor power storage that stores power generated by each of the plurality of power generation elements and supplied to a magnetic sensor corresponding to the power generation element among the plurality of magnetic sensors,
   a power storage that stores power generated by each of the plurality of power generation elements and supplied to other than the plurality of magnetic sensors, and
   a disconnection unit that electrically disconnects the sensor power storage from the power storage.

10. The rotation detector according to claim 1, wherein the plurality of power generation elements are disposed with an angular interval larger than or equal to an angular interval between a first position where one power generation element among the plurality of power generation elements generates power when the rotary shaft rotates clockwise and a second position closest to the first position among one or more positions where the one power generation element generates power when the rotary shaft rotates counterclockwise in a rotation direction of the rotary shaft, and
   each of the plurality of magnetic sensors is disposed at a same position as a corresponding power generation element among the plurality of power generation elements or at a position shifted from the corresponding power generation element by 180 degrees in the rotation direction of the rotary shaft.

11. A rotation detection method using a rotation detector, the rotation detector including a magnet that rotates together with a rotary shaft, a plurality of power generation elements that generate power according to a change in a magnetic field due to rotation of the magnet together with the rotary shaft, a plurality of magnetic sensors each provided to a corresponding one of the plurality of power generation elements, and a generated power supply unit that supplies power generated by each of the plurality of power generation elements only to the corresponding one of the plurality of magnetic sensors, the method comprising:
   determining in which region among a plurality of regions arranged in a rotation direction of the rotary shaft a reference position in the rotation direction of the rotary shaft is located, based on power generation information indicating a power generation element that has generated power among the plurality of power generation elements and detection information indicating a detection result from a magnetic sensor corresponding to the power generation element among the plurality of magnetic sensors; and
   storing a region in which the reference position is determined to be located among the plurality of regions.

* * * * *